US005509379A

United States Patent [19]
Hoeschen

[11] Patent Number: 5,509,379
[45] Date of Patent: Apr. 23, 1996

[54] AUTOMATED CAT LITTER BOX

[76] Inventor: Edward P. Hoeschen, 1500 Eastlake Ave. East, Suite 201, Seattle, Wash. 98102

[21] Appl. No.: 230,341

[22] Filed: Apr. 20, 1994

[51] Int. Cl.$^6$ ................................................ A01K 1/035
[52] U.S. Cl. ................................ 119/166; 209/288
[58] Field of Search ............................ 119/166, 163, 119/164; 209/235, 288, 293, 294

[56] References Cited

U.S. PATENT DOCUMENTS

| | | | |
|---|---|---|---|
| 1,268,450 | 6/1918 | Gauntt | 209/235 |
| 4,120,264 | 10/1978 | Carter | 119/166 |
| 4,846,104 | 7/1989 | Pierson, Jr. | 119/166 |
| 5,048,464 | 9/1991 | Shirley | 119/166 |
| 5,107,797 | 4/1992 | LaRoche | 119/166 |
| 5,178,099 | 1/1993 | Lapps et al. | 119/166 |

FOREIGN PATENT DOCUMENTS 0297015  12/1988  European Pat. Off. ............. 119/166

*Primary Examiner*—Todd E. Manahan
*Attorney, Agent, or Firm*—Seed and Berry

[57] ABSTRACT

An animal litter box is disclosed for automatically separating waste materials from animal litter. A rotating cylinder is provided with an internal surface for receiving the animal litter and waste materials. A perforated surface has one end fixed to the internal surface of the rotating cylinder so that as the cylinder is rotated, the animal litter and waste materials fall onto the perforated surface. The perforated surface includes openings sized to permit the animal litter to fall through the perforated surface and sized to capture the waste materials upon the perforated surface. A collection assembly is coupled to the perforated surface so that as the rotating cylinder continues to rotate, the waste materials supported on the perforated surface are guided to the collection assembly and are thereafter conducted to a waste reservoir. After the rotating cylinder has been rotated 360°, the waste has been separated from the animal litter and is stored in the reservoir with the animal litter ready to receive new kitty urine and solid waste materials.

12 Claims, 3 Drawing Sheets

AUTOMATED CAT LITTER BOX

TECHNICAL FIELD

The present invention is directed toward animal litter boxes and, more particularly, toward a kitty litter box having a mechanism for automatically separating waste material from kitty litter.

BACKGROUND OF THE INVENTION

Animal litter boxes for storing animal litter thereby to provide a receptacle for animal waste are well known. Typically, the animal litter and the animal waste must be discarded at regular intervals to prevent odors and to keep the litter box clean. Prior art litter boxes require the cleaning of the litter box, including discarding the animal litter and waste, to be done manually.

Recently, developments in animal litter technology have resulted in animal litter that causes animal urine to coagulate in solid ball-like pieces. After the urine has formed into the solid ball-like pieces, the urine and solid waste can be separated from the animal litter to permit the animal litter to be reused. This animal represents a significant advance in the litter industry. However, litter boxes remain of a form that must be manually cleaned.

Accordingly, it is desirable to provide a litter box that is capable of automatically separating waste materials from the animal litter.

SUMMARY OF THE INVENTION

The present invention is an animal litter box for removing waste materials from animal litter. The animal litter box includes a rotating cylinder assembly for supporting the animal litter and waste materials. The rotating cylinder assembly includes an internal surface upon which the animal litter and waste materials are supported. The animal litter box also includes a perforated surface that is responsive to rotation of the rotating cylinder assembly for receiving the animal litter and waste material and for separating the animal litter from the waste materials. The animal litter box also includes a collection assembly that is responsive to rotation of the rotating cylinder assembly for receiving the waste materials from the perforated surface and for storing the waste materials.

In a further embodiment of the invention, the perforated surface comprises a receiving/separation surface having a first end fixed to the internal surface of the rotating cylinder assembly so that as the rotating cylinder assembly is rotated, the waste material and animal litter falls onto the receiving/separation surface. The receiving/separation surface further includes perforations that are sized to permit the animal litter to pass through the receiving/separation surface and to prevent the waste material from falling through the receiving/separation surface thereby to separate the animal litter from the waste materials. In still a further embodiment of the invention, the receiving/separation surface comprises a screen.

In still a further alternative embodiment of the invention, the collection assembly includes a scoop that is coupled to the perforated surface for receiving the waste materials separated from the animal litter. A reservoir is provided for receiving the separated waste material for storage. A conduit is coupled intermediate the scoop and the reservoir for conducting the waste material from the scoop to the reservoir. The reservoir may be mounted in the rotating cylinder assembly, or, alteratively, may be positioned external to the rotating cylinder.

DETAILED DESCRIPTION OF THE INVENTION

Figure 1:
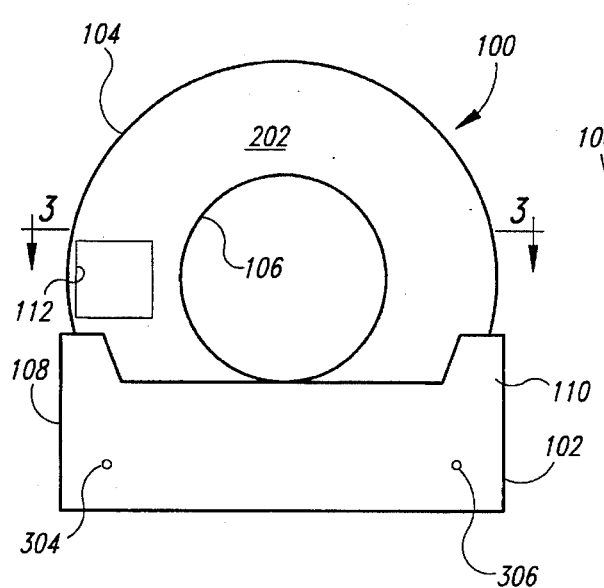
FIG. 1 is a front view illustrating the kitty litter box that is the subject of the present invention.
Figure 2:
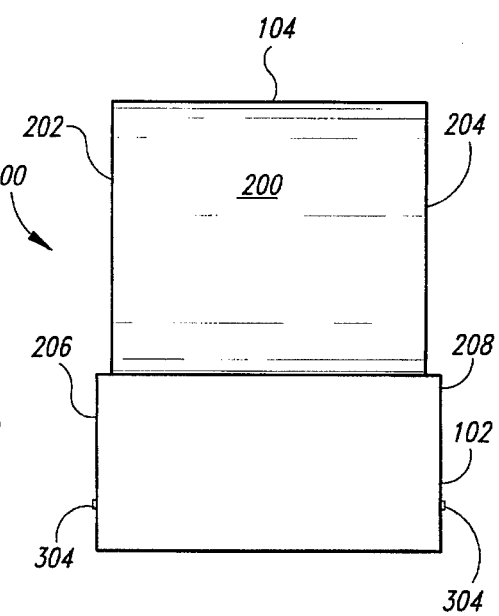
FIG. 2 is a side view illustrating the kitty litter box that is the subject of the present invention.

A kitty litter box 100 is illustrated in FIG. 1. The kitty litter box 100 includes a base portion 102 and a cylinder 104. Referring to the side view of the kitty litter box 100 provided in FIG. 2, it will be appreciated that the base portion is a substantially rectangular box-like member constructed to rest upon a support surface. The base 102 includes first and second ends 108 and 110 (FIG. 1) as well as first and second sides 206 and 208 (FIG. 2).

The cylinder 104 is positioned within the base portion 102. The base portion 102 includes first and second elongated rollers 300 and 302 that are mounted in the base 102 and constructed to rotate about first and second respective axes 304 and 306. Those skilled in the art will appreciate that each first and second roller 300 and 302 extends the width of the base 102 thereby rotatably supporting the cylinder 104.

Figure 3:
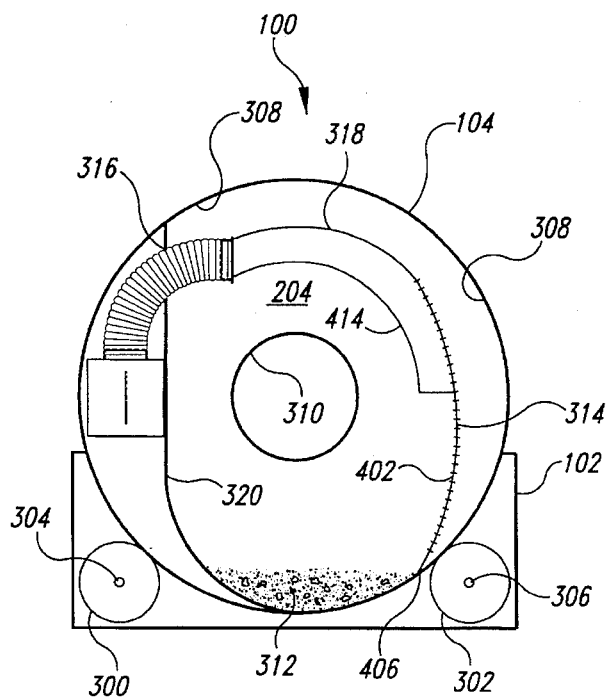
FIG. 3 is a sectional view, taken along line 3—3 of FIG. 1.

The cylinder 104 has a substantially circular wall member 200 (FIG. 2) that defines an internal surface 308 (FIG. 3). The cylinder 104 also includes first and second substantially circular side portions 202 and 204, each being fixed to said wall member 200. As best illustrated in FIGS. 1 and 3, each side portion 202 and 204 includes a circular throughhole 106 and 310, respectively, through which the kitten is permitted access into the kitty litter box.

In accordance with the present invention, the kitten enters the kitty litter box through one of the above-referenced throughholes 106 and 3 10, to deposit kitty waste. Advantageously, kitty litter 312 is used in the kitty litter box 100 of the type that causes urine to coagulate into solid ball-like pieces. This is desirable so that all of the waste deposited in the kitty litter box 100, e.g., both urine and solid waste, will be in a solid particulate form of substantial size. The value of the subject kitty litter box 100, is that the user can easily clean the kitty litter 312 to improve sanitization and prevent odors intermediate times when the kitty litter box 100 is cleaned. Cleaning of the kitty litter 312 within the kitty litter box 100 is performed by rotating the cylinder 104 within the base 102 one full revolution, as will be described in more detail below.

The kitty litter box 100 includes a separation assembly 314 and a collection assembly 316, both illustrated in FIG. 3. The separation assembly 314 is provided to receive the combination of kitty litter 312 and animal waste and to separate the kitty litter from the animal waste. The collection assembly 316 is provided for receiving the animal waste from the separation assembly 314 and for storing the animal waste for disposal by the user. Both the receiving assembly and the collection assembly are constructed to respond to rotation of the cylinder 104 to perform the separating and collecting function described.

Figure 4:
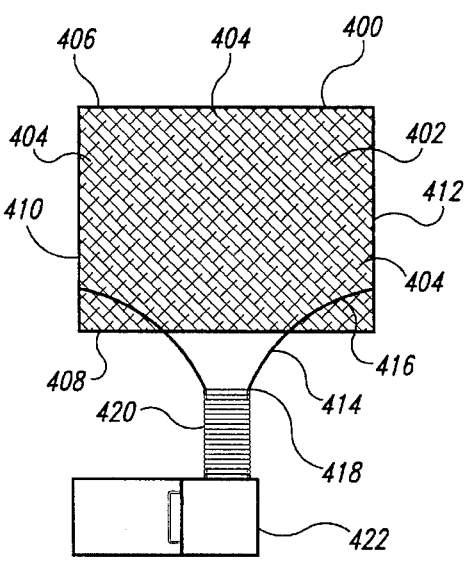
FIG. 4 is an illustration of the separation and collection assembly of the improved kitty litter box.

More particularly, the separating assembly 314 comprises a screen 400 (FIG. 4) that includes a receiving surface 402. The separation screen 400 is provided with openings 404 that are sized large enough to permit the kitty litter 312 to pass through the screen 400 and that are sized small enough to capture the waste material upon the receiving surface 402 of the screen 400 thereby separating the waste material from the kitty litter. The separation screen includes first and second ends 406 and 408 as well as first and second sides 410 and 412. The separation screen is mounted within the cylinder 104 with the first end 406 proximate the internal surface 308 of the cylinder and with the first and second sides 410 and 412 proximate the first and second sides 206 and 208, respectively, of the base 102.

Figures 5, 6:
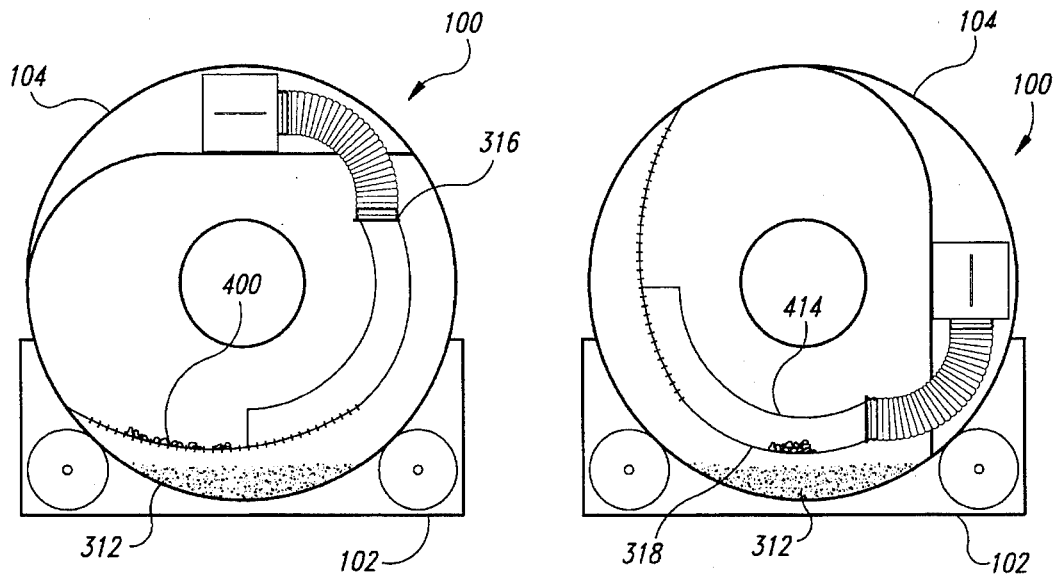
FIGS. 5–8 are sectional views taken along line 3—3 of FIG. 1 illustrating the operation of the improved kitty litter box.

Accordingly, as the cylinder 104 is rotated within the base 102, the combination of kitty litter and animal waste falls upon the first end 406 of the separation screen 400. As best illustrated in FIG. 5, continued rotation of the cylinder 104 causes the combination of waste and animal litter to fall upon the separation screen 400 so that the kitty litter 3 12 passes through the separation screen and so that the animal waste is supported upon the separation screen ready to be received by the collection assembly 316.

Returning to FIG. 4, the collection assembly includes a scoop 414 having a first end 416 that is coupled to the separation screen 400. A second end 418 of the scoop 414 is coupled to a flexible conduit 420 which is in turn coupled to a reservoir 422. The scoop 4 14 includes a substantially solid surface 318 upon which the waste is supported after continued rotation of the cylinder 104, as illustrated in FIG. 6.

Figures 7, 8:
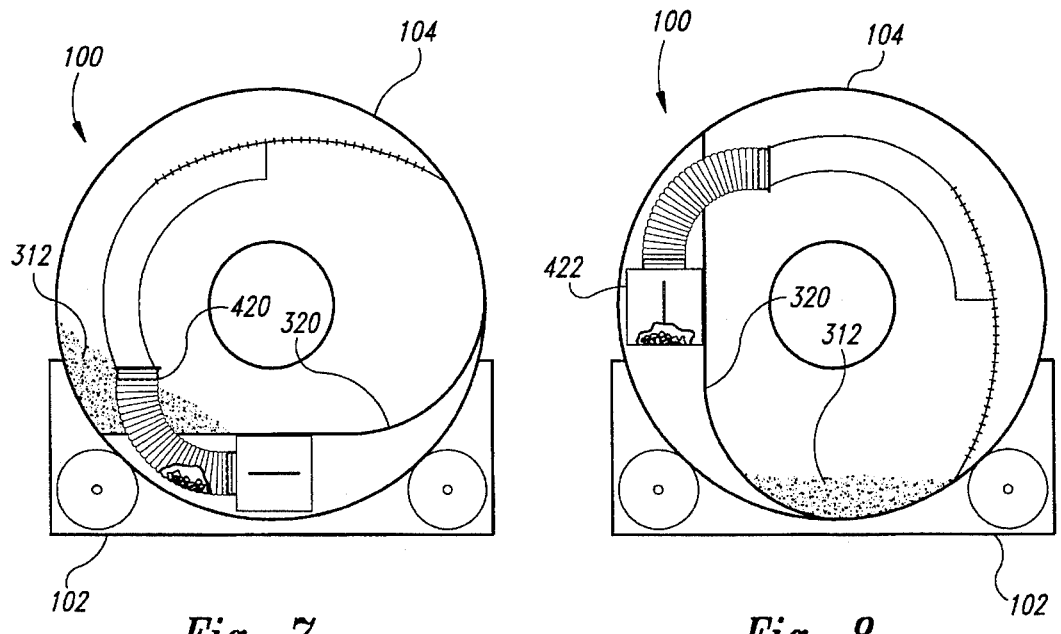

With still further rotation of the cylinder 104 (FIG. 7), the waste is conducted to the flexible conduit 420 and, with still further rotation, is conducted to the reservoir 422 (FIG. 8). At this stage, the kitty litter has been cleaned and the waste deposited in the reservoir for disposal by the user. Advantageously, the side portion 202 includes a reservoir access opening 112 (FIG. 1) to permit the user to access the reservoir 422. The reservoir 422 is removably coupled to the flexible conduit 420 thereby permitting the reservoir to be removed from the kitty litter box 100 for disposal of the waste.

Advantageously, the kitty litter box also includes a deflection surface 320 (FIG. 3) upon which the kitty litter is received during rotation of the cylinder 104, as illustrated in FIG. 7. The deflection surface 320 deflects the kitty litter 312 away from the conduit 420, reservoir 422, and access opening 112 so that substantially all of the kitty litter 312 is returned to its original position within the kitty litter box 100.

Figure 9:
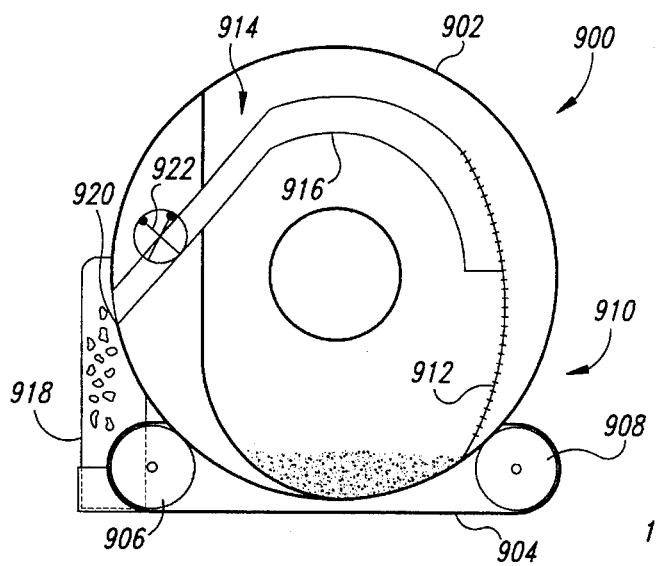
FIG. 9 is a sectional view of an alternative embodiment of the improved kitty litter box.

An alternative embodiment of the improved kitty litter box 900 is illustrated in FIG. 9. Therein, a cylinder 902 is rotatably mounted in a base 904 upon first and second rollers 906 and 908, substantially as described above by reference to the improved kitty litter box 100. A separation assembly 910 including a receiving/separation surface 912 is mounted in the cylinder 902. A collection assembly 914 includes a conduit 916 and a reservoir 918.

As described above, the separation assembly 910 is responsive to rotation of the cylinder 902 to separate animal waste from kitty litter. Similarly, the collection assembly 914 is responsive to rotation of the cylinder 902 to receive the animal waste from the separation assembly 9 10 and for storing the animal waste.

However, in the embodiment illustrated in FIG. 9, the conduit 916 is constructed to conduct the animal waste from the separation assembly 910 to a waste throughhole 920 constructed in the side of the cylinder 902. A weighted trap surface is positioned in the conduit 916 and constructed to open upon rotation of the cylinder thereby permitting animal waste to be conducted to the waste throughhole 920 and deposited in the reservoir 918.

Figure 10:
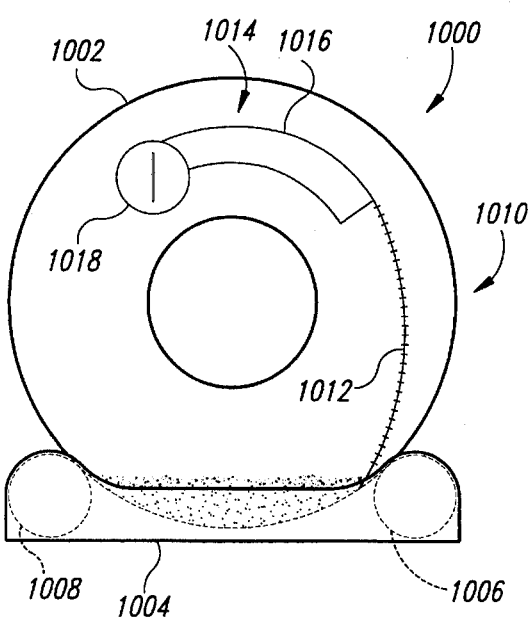
FIG. 10 is another alternative embodiment of the subject kitty litter box.

Still another alternative embodiment of the improved kitty litter box 1000 is illustrated in FIG. 10. Therein, a cylinder 1002 is rotatably mounted in a base 1004 upon first and second rollers 1006 and 1008, substantially as described above by reference to the improved kitty litter boxes 100 and 900. A separation assembly 1010 includes a receiving/ separation surface 1012 and is mounted in the cylinder 1002. A collection assembly 1014 includes a conduit 1016 and reservoir 1018.

Like the embodiments described above by reference to FIGS. 1–9, the separation assembly 1010 of the embodiment illustrated in FIG. 10 is responsive to rotation of the cylinder 1002 to separate animal waste from kitty litter. Likewise, the collection assembly 1014 is responsive to rotation of the cylinder 1002 to receive the animal waste from the separation assembly 1010 and to store the animal waste.

In the embodiment illustrated in FIG. 10, the reservoir 1018 comprises an elongated cylinder extending from the first side portion 202 to the second side portion 204 of the cylinder 1002 (as best illustrated in FIG. 2). The elongated cylinder is removable from the side portion for disposal of the animal waste.

Figure 11:
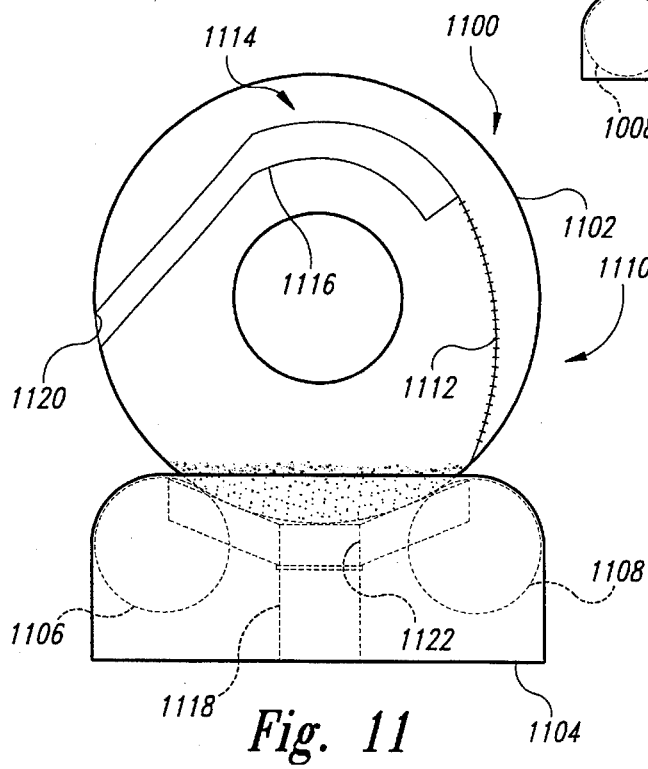
FIG. 11 is still another alternative embodiment of the subject kitty litter box.

Still another alternative embodiment of the improved kitty litter box 1100 is illustrated in FIG. 11. The kitty litter box 1100 includes a cylinder 1102 rotatably mounted in a base 1104 upon first and second rollers 1106 and 1108. A separation assembly 1110 including a receiving/separation surface 1112 is mounted in the cylinder 1102. A collection assembly 1114 includes a conduit 1116 and a reservoir 1118, the reservoir being mounted in the base 1104 substantially intermediate the first and second rollers 1106 and 1108.

As above, the separation assembly 1110 is responsive to rotation of the cylinder 1102 to separate animal waste from kitty litter. The collection assembly 1114 is responsive to rotation of the cylinder 1102 to receive the animal waste from the separation assembly 1110 and for storing the animal waste.

Like the embodiment of FIG. 9, the conduit 1116 is constructed to conduct the animal waste from the separation assembly 1110 to a waste throughhole 1120 constructed in the side of the cylinder 1102. A mating throughhole 1122 is constructed in the base 1104 for permitting the animal waste to be conducted from the waste throughhole 1120 to the reservoir 1118.

Those skilled in the art will appreciate that the weighted trap surface 922, described by reference to the embodiment illustrated in FIG. 9, may be advantageously used with either of the embodiments described in FIGS. 1–8 and 10–11.

It will be apparent to those skilled in the art that, although only several presently preferred embodiments of the invention have been described in detail herein, many modifications and variations may be provided without departing from the true scope and spirit of the invention. Accordingly, the invention is not limited except as by the appended claims.

I claim:

1. An animal litter box for removing waste materials from animal litter comprising:

rotating cylinder means for supporting the animal litter and waste materials, said rotating cylinder means including an internal surface upon which the animal litter and waste materials are supported;

perforated surface means extending along a portion of said internal surface and responsive to rotation of said rotating cylinder means for receiving the animal litter and waste materials and for separating the animal litter from the waste materials in a single revolution of said cylinder means; and collection means within said rotating cylinder means, said collection means comprising:

scoop means coupled to said perforated surface means for receiving the waste material separated from said animal litter;

reservoir means for receiving the separated waste material for storage; and conduit means coupled to said scoop means for conducting the waste material from said scoop means to said reservoir means.

2. The animal litter box as recited in claim 1 wherein said perforated surface means comprises a receiving surface having a first end fixed to said internal surface of said cylinder means so that as said rotating cylinder means is rotated the waste material and animal litter falls onto said receiving surface.

3. The animal litter box as recited in claim 1 wherein said perforated surface means comprises a separation surface having perforations sized to permit the animal litter to pass through said separation surface.

4. The animal litter box as recited in claim 1 wherein said perforated surface means comprises a receiving/separation surface having a first end fixed to said internal surface of said rotating cylinder means so that as said rotating cylinder means is rotated the waste material and animal litter falls onto said receiving/separation surface, said receiving/separation surface further including perforations sized to permit the animal litter to pass through said receiving/separation surface.

5. The animal litter box as recited in claim 1 wherein said perforated surface means comprises a screen.

6. An animal litter box for removing waste materials from animal litter, said animal litter box comprising:

a base support having a container rotatably mounted thereon, said container having an internal surface, said internal surface having a waste portion that is constructed for supporting the animal litter and receiving the animal waste;

a perforated surface having first and second ends, said first end of said perforated surface being fixed to said internal surface of said container and extending about a portion of said internal surface, said second end of said perforated surface being displaced from said internal surface of said container so that as said container is rotated the combination waste material and animal litter falls upon said perforated surface, said perforated surface including openings sized to permit the animal litter to pass through said perforated surface and to prevent the waste material from passing through said perforated surface so that said perforated surface separates the waste material from the animal litter in a single revolution of said container with the waste material being supported upon said perforated surface;

a scoop having a first end and a second end, said first end of said scoop being fixed to said second end of said perforated surface to collect waste materials captured upon said perforated surface;

a flexible conduit having first and second ends, said first end of said flexible conduit being fixed to said second end of said scoop to receive waste materials collected by said scoop;

a reservoir for storing the waste materials, said reservoir including an opening removably coupled to said second end of said flexible conduit to receive waste materials from said conduit; and a deflection surface having first and second ends each being fixed to said internal surface of said cylinder, said reservoir being positioned intermediate said deflection surface and said internal surface of said container, said deflection surface including a throughhole through which said flexible conduit extends, said deflection surface being positioned to deflect the animal litter that passes through said screen away from said second end of said flexible conduit.

7. The animal litter box as recited in claim 6 wherein said deflection surface includes a throughhole through which said conduit extends, said deflection surface being positioned to deflect the animal litter that passes through said screen away from said second end of said conduit.

8. The animal litter box as recited in claim 6, further including a weighted trap surface rotatably mounted to said conduit having a first portion positioned in said container and a second weighted portion positioned exterior to said container and being mounted to rotate about an axis located at the surface of said container, said weighted trap surface being constructed to open to permit the waste material to flow from said scoop to said waste through hole in said container.

9. The animal litter box of claim 6 wherein said reservoir has a cylindrical cross section.

10. The animal litter box of claim 6 wherein said container has first and second ends, said reservoir being mounted within said container and substantially extending from said first container end to said second container end.

11. A kitty litter box for removing waste materials from kitten litter, said kitty litter box comprising:

a base constructed to rest upon a support surface, said base having first and second elongated rollers positioned at first and second opposite ends of said base;

a cylinder rotatably mounted upon said first and second elongated rollers, said cylinder having a substantially circular wall member defining an internal surface, said cylinder further including first and second substantially circular side portions each fixed to said wall member and having a circular throughhole to permit access to said internal surface;

a separation screen positioned in said cylinder along a first side thereof, said separation screen having a first end proximate said internal surface of said cylinder, said separation screen having a second end displaced from said internal surface of said cylinder, said screen having openings sized large enough to permit the kitten litter to pass through said screen and sized small enough to capture the waste materials;

a scoop having a first end and a second end, said first end of said scoop being fixed to said second end of said screen to collect waste materials captured upon said screen;

a flexible conduit having first and second ends, said first end of said flexible conduit being fixed to said second end of said scoop to receive waste materials collected by said scoop;

a deflection surface having first and second ends each being fixed to said internal surface of said cylinder, said deflection surface including a throughhole through which said flexible conduit extends, said deflection surface being positioned to deflect the kitty litter that passes through said screen away from said second end of said flexible conduit; and a reservoir for storing the waste materials, said reservoir being positioned intermediate said deflection surface and said internal surface of said cylinder, said first side portion of said cylinder including an opening to permit access to said reservoir, said reservoir including an opening removably coupled to said second end of said flexible conduit to receive waste materials from said conduit.

12. A kitty litter box for removing waste materials from kitten litter, said kitty litter box comprising:

a base constructed to rest upon a support surface, said base having first and second elongated rollers positioned at first and second opposite ends of said base;

a cylinder rotatably mounted upon said first and second elongated rollers, said cylinder having a substantially circular wall member defining an internal surface, said cylinder further including first and second substantially circular side portions each fixed to said wall member and having a circular throughhole to benefit access to said internal surface, said wall member including a waste throughhole;

a separation screen positioned in said cylinder along a first side thereof, said separation screen having a first end proximate said internal surface of said cylinder, said separation screen having a second end displaced from said internal surface of said cylinder, said screen having openings sized large enough to permit the kitten litter to pass through said screen and sized small enough to capture the waste materials;

a scoop having a first end and a second end, said first end of said scoop being fixed to said second end of said screen to collect waste materials captured upon said screen;

a conduit having first and second ends, said first end of said conduit being fixed to said second end of said scoop to receive waste materials collected by said scoop, said conduit extending from said second end of said scoop to said waste throughhole in said wall member of said cylinder, said second end of said conduit being coupled to said waste throughhole;

a weighted trap surface rotatably mounted to said conduit having a first portion positioned in said cylinder and a second weighted portion positioned exterior to said cylinder and being mounted to rotate about an axis located at the surface of said cylinder, said weighted trap surface being constructed to open to permit the waste material to flow from said scoop to said waste throughhole in said cylinder;

a deflection surface having first and second ends each being fixed to said internal surface of said cylinder, said deflection surface including a throughhole through which said conduit extends, said deflection surface being positioned to deflect the kitty litter that passes through said screen away from said second end of said conduit; and a reservoir for storing the waste materials, said reservoir being supported upon said base proximate said wall member of said cylinder to receive waste materials from said conduit.

\* \* \* \* \*